United States Patent [19]

Kanmoto et al.

[11] Patent Number: 5,414,535
[45] Date of Patent: May 9, 1995

[54] APPARATUS FOR READING IMAGE FROM ORIGINAL IMAGE ON TRANSLUCENT FILM WITH AUTOMATIC ADJUSTMENT OF THE QUANTITY OF LIGHT FROM A LIGHT SOURCE

[75] Inventors: Yoshiaki Kanmoto, Machida; Haruhiko Fukuda, Kawasaki; Kohtaroh Yonenaga, Yokohama; Hiroyasu Shijo, Kawasaki, all of Japan

[73] Assignee: Ricoh Company, Ltd., Tokyo, Japan

[21] Appl. No.: 886,168

[22] Filed: May 21, 1992

[51] Int. Cl.⁶ .................... H04N 1/04; H04N 1/46; H04N 1/40; H04N 1/38
[52] U.S. Cl. .................... 358/487; 358/461; 358/447; 358/448; 358/506; 358/475; 358/464; 358/504; 358/530
[58] Field of Search ............. 358/487, 405, 461, 447, 358/448, 453, 506, 530, 464, 475, 504; 359/885, 888, 889, 891

[56] References Cited

U.S. PATENT DOCUMENTS

| | | | |
|---|---|---|---|
| 3,193,687 | 7/1965 | Hatcher | 250/216 |
| 3,536,402 | 10/1970 | Aston | 355/35 |
| 3,856,418 | 12/1974 | Levine | 356/233 |
| 4,914,556 | 4/1990 | Richardson | 362/293 |
| 4,922,335 | 5/1990 | Outa | 358/475 |
| 4,933,983 | 6/1990 | Hiramatsu | 382/8 |
| 4,969,053 | 11/1990 | Outa et al. | |
| 5,032,903 | 7/1991 | Suzuki | 358/75 |
| 5,084,772 | 1/1992 | Shimoyama | 358/461 |

FOREIGN PATENT DOCUMENTS

| | | |
|---|---|---|
| 0415152 | 3/1991 | European Pat. Off. |
| 3306162 | 9/1983 | Germany |
| 3509825 | 9/1986 | Germany |
| 63-292121 | 11/1988 | Japan |
| 2100459 | 4/1990 | Japan |

*Primary Examiner*—Edward L. Coles, Sr.
*Assistant Examiner*—Allan Esposo
*Attorney, Agent, or Firm*—Oblon, Spivak, McClelland, Maier & Neustadt

[57] ABSTRACT

An image reading apparatus includes a projector for projecting light through a translucent film so as to produce a projected image from an original image on the film, a correction part for adjusting a quantity of the light, an image sensor for reading out an image from the projected image and outputting an analog signal indicating the read-out image, a signal conversion part for converting the analog signal into a digital signal indicating the read-out image, and a control part for measuring a peak value of digital signals supplied by the signal conversion part with respect to an effective range of the original image, and for allowing the correction part to adjust appropriately the quantity of the projected light in response to the measured peak value of the digital signals.

6 Claims, 12 Drawing Sheets

APPARATUS FOR READING IMAGE FROM ORIGINAL IMAGE ON TRANSLUCENT FILM WITH AUTOMATIC ADJUSTMENT OF THE QUANTITY OF LIGHT FROM A LIGHT SOURCE

BACKGROUND OF THE INVENTION

The present invention generally relates to an image reading apparatus, and more particularly to an image reading apparatus provided with a projector unit for projecting an image from an original image on a translucent film. This apparatus is applicable to a copying machine, a film reader, an electronic filing system, a facsimile machine and the like.

An image reading apparatus provided with a projector unit for projecting an image from an original image on a translucent film (including a negative image film and a positive image film) has been devised in order to read out an image signal by scanning such an original image under appropriate light quantity conditions. For example, a microfilm reader (or a microfilm reader/printer) provided with a projector for projecting an image from a translucent microfilm by emitting light to the microfilm, is one of the above described apparatus. Such a device always maintains the quantity of light in the projector unit at a constant level during an image reading process.

However, when an image signal is read out by an image reader from an original image, it is necessary that different light sources be used for two kinds of original images: a reflection type image (for example, a document image) and a translucent type image. The illuminances of images projected from these two kinds of original images, and the spectral transmittance distributions of the transmitting light are considerably changed according to the light source used. Thus, if the light quantity of the light source for only the translucent film type image is fixed or maintained at a constant level, it is necessary to use two different image processing circuits dealing with image signals at separate levels, which signals are obtained from the two kinds of original images. Therefore, the light quantity of the projector lamp in the above described apparatus cannot be accurately adjusted to suitably control the light quantity, and there is a problem in that the size of the circuitry in the above apparatus becomes relatively large, thus increasing its manufacturing cost.

Japanese Laid-Open Patent Application No. 63-292121 discloses an image projector device using light quantity adjustment. In this device, an image is projected onto an image reader part at an appropriate illuminance, the image reading part being made from a number of charge coupled devices (CCDs). According to the method of this reference, electric voltage applied to a lamp of a projector unit is adjusted according to an image signal obtained by the CCD unit from the projected image so that an image is projected at an appropriate illuminance of the light emitted by the projector lamp. However, the voltage applied to the projector lamp is adjusted so as to obtain a desired light quantity from the projector lamp, and therefore the color temperature of the lamp is considerably changed and the spectral transmittance distribution of the transmitting light is excessively changed. Especially when a color image is read out from a color original image, it is difficult to accurately adjust a shading data because the ratio of the levels of color signals obtained from the original image is considerably changed. In some cases, undesired shading takes place in the reproduced color image, and the color of the original image is incorrectly turned into a different color.

Moreover, Japanese Laid-Open Patent Application No. 2-100459 discloses another one of the above described apparatus. In the apparatus of this reference, an image signal is obtained by a CCD reading part from a projected image, and a difference between a light quantity corresponding to the image signal and a predetermined light quantity is calculated and this calculated difference is output to a display device. By viewing the displayed difference, a user can manually adjust the light quantity emitted by a projector unit. However, there still remains the above mentioned problem due to the variations of the voltage applied to the lamp. The light quantity must be manually adjusted by the user, which adjustment work requires additional time and labor. In addition, the manual adjustment by the user is likely to produce large variations of the light quantity of the light source.

SUMMARY OF THE INVENTION

Accordingly, it is a general object of the present invention to provide an improved image reading apparatus in which the above described problems are eliminated.

Another, more specific object of the present invention is to provide an image reading apparatus which can produce a high quality image from an original image on a translucent film by using a simple, in-expensive reading process. Still another object of the present invention is to provide an image reading apparatus which automatically and accurately adjusts the quantity of light from the light source of the projector unit in response to the peak value of image signals obtained from the original image. The above mentioned objects of the present invention can be achieved by an image reading apparatus which includes a projector unit for projecting light through a translucent film so as to produce a projected image from an original image on the translucent film, a correction part for adjusting a quantity of the light projected by the projector unit, an image sensor for reading out an image from the projected image produced by the projector unit and outputting an analog signal indicating the read-out image, a signal conversion part for converting the analog signal output by the image sensor into a digital signal indicating the read-out image, and a control part for measuring a peak value of digital signals supplied by the signal conversion part with respect to an effective range of the original image, and for allowing the correction part to adjust appropriately the quantity of the projected light in response to the measured peak value of the digital signals. According to the present invention, it is possible to accurately adjust the quantity of light emitted by the light source of the projector unit in response to the peak value of the image signals read out from the original image without seriously changing the spectral transmittance distribution of the transmitting light and without changing the color temperature of the light source. Therefore, it is possible to produce a high quality image from a translucent film type original image because the correction of the shading data and the scanning of the original image are carried out with an optimum light quantity of the light source.

Other objects and further features of the present invention will become more apparent from the following detailed description when read in conjunction with the accompanying drawings.

DESCRIPTION OF THE PREFERRED EMBODIMENTS

Figure 4:
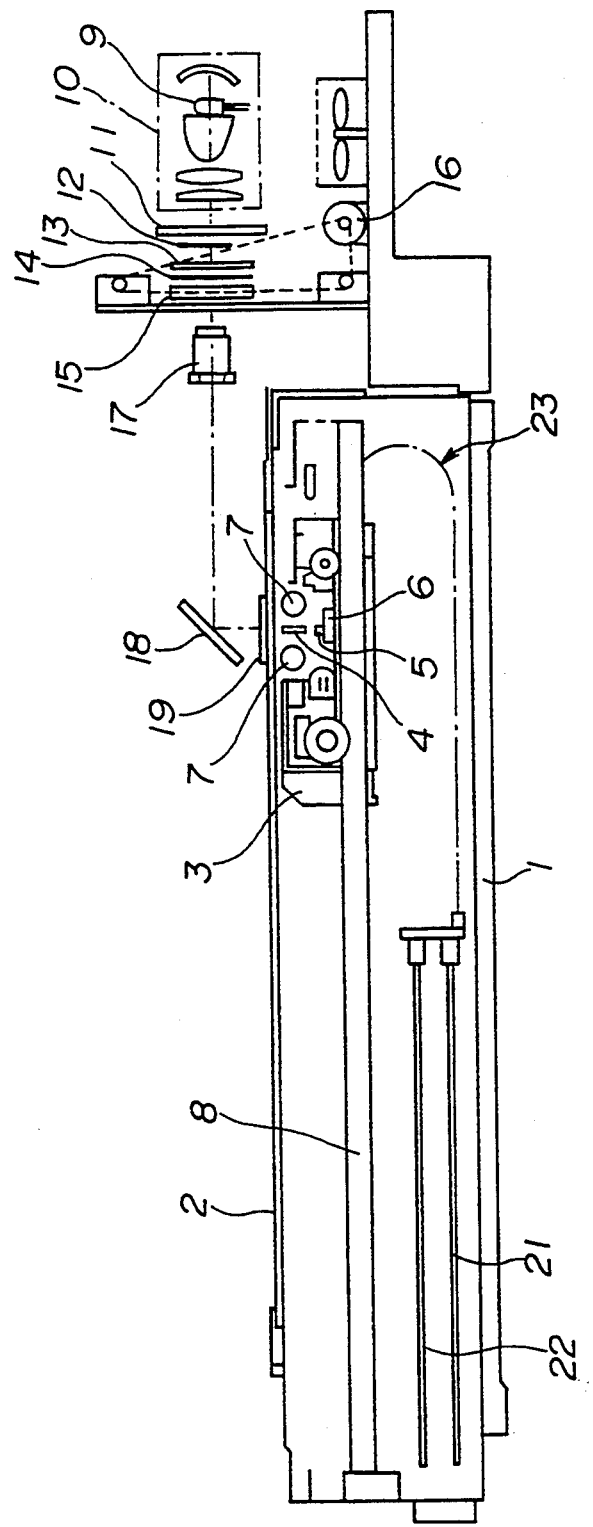
FIG. 4 is a sectional view showing the image reading apparatus to which the invention is applied.

A description will now be given of an embodiment of the present invention. FIG. 4 shows an image reading apparatus which incorporates a film-scan-type slide projector unit (which is called hereinafter a SPU). Generally, the image reading apparatus has the SPU for projecting an image from an original image, and an image reader unit for reading out an image signal from a projected image obtained by the SPU from a translucent type original image and for reading out an image signal from a reflection type original image (e.g., an original image on an opaque film or paper). The SPU projects an image from the translucent film image onto the image reading part so that an image signal is output by the image reading part from a projected image. This apparatus is thus capable of reading out an image signal from either the opaque original image or the translucent film original image.

The image reader unit has a frame 1, a contact glass 2, a scanner carriage 3 supported on a guide rod 8 and moved by a driving mechanism (not shown) operated by a power source (not shown) along a line of the guide rod 8 when an opaque type original image is read, an analog signal processing part 21 (e.g., a printed circuit board) performing analog signal processing, and a digital signal processing part 22 (e.g., a printed circuit board) performing digital signal processing.

In the scanner carriage 3, a set of light source units 7 for illuminating a reflection type original image on the contact glass 2, a convergent light transmitting member 4, and a number of photoelectric conversion elements (e.g., CCDs) 6 for converting the illuminated light into an analog signal are provided. Also, in the scanner carriage 3, a color correction filter 5 is provided on the CCDs 6 for correcting the color sensitivity of the CCDs 6 with respect to the analog signal. Also, the scanner carriage 3 is provided with a printed circuit board (not shown) on which a substrate layer for driving the CCDs 6 and an amplifier circuit for amplifying a level of the analog signal output by the CCDs 6 are printed. The scanner unit is electrically connected to the part 21 and to the part 22 via a cable 23.

Figure 2:
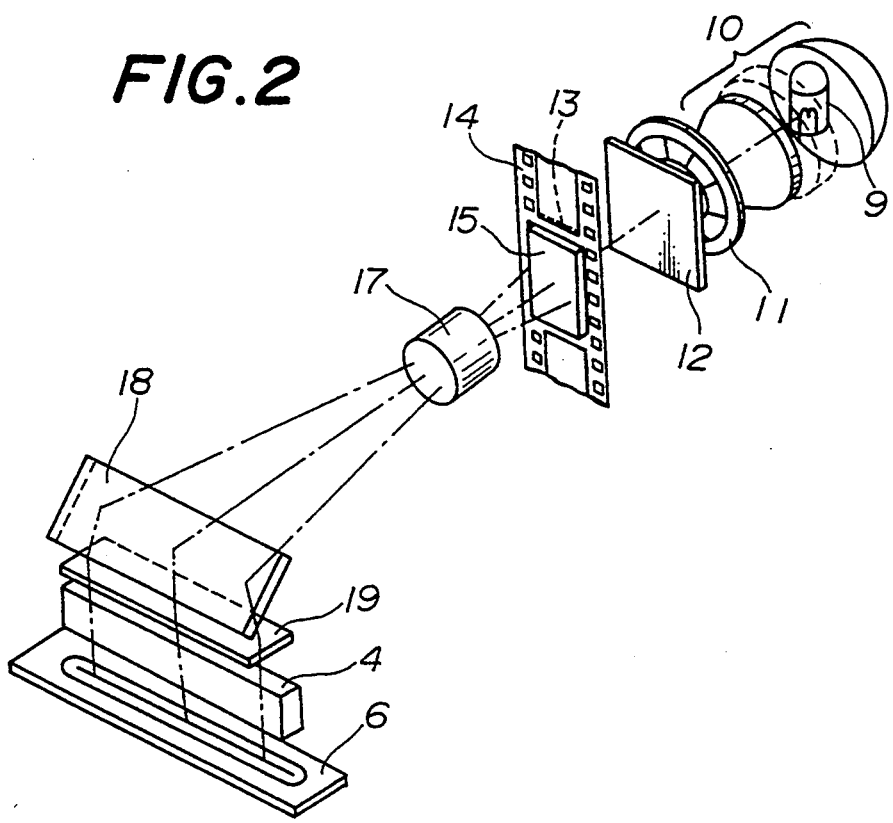
FIG. 2 is a perspective view showing the construction of the slide projector unit.

FIG. 2 shows a detailed structure of the SPU unit in the image reading apparatus. In the SPU unit, a translucent film 14 having an original image is slidably supported by a retaining glass 13 onto a reference glass 15. A light source unit 10 including a lamp 9 as the light source illuminates the translucent film 14 so that an image is projected from the original image on the film 14 to the image reader unit. In FIG. 2, the SPU also includes a light quantity corrector 11 correcting the quantity of light emitted by the unit 10, and a color correcting filter 12 for achieving color matching between the slide projector unit and the image reader unit.

* * *

Figure 3:
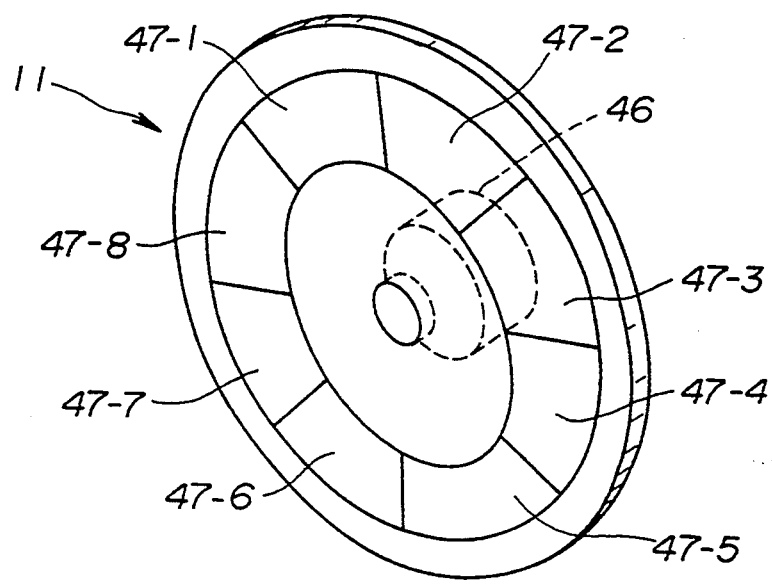
FIG. 3 is a perspective view showing a light quantity corrector of the slide projector unit.

FIG. 3 shows a detailed structure of the light quantity corrector 11 provided in the SPU shown in FIG. 2. The light quantity corrector 11 has a circular shape and is provided with an ND filter unit 47 and a motor 46 for rotating the ND filter unit 47. This ND filter unit 47 includes a set of ND filters having a number of steps of different transmission factors, and the ND filters are circumferentially arranged in the circular ND filter unit 47 around a rotating shaft of the motor 46. For example, the ND filter unit 47 includes eight ND filters 47-1 through 47-8 which are circumferentially arranged, each of the ND filters having a different transmission factor. The number of the ND filters provided within the corrector 11 is varied depending on the range of required transmittance values. A number of steps of different transmission factors is given to the ND filters. In this light quantity corrector 11, one of the ND filters having a desired transmission factor is selected by rotating movement of the corrector 11 rotated by the motor 46, so that the quantity of transmitting light can be adjusted in a wide range of quantities of the transmitting light. The light quantity corrector 11 is arranged in a condition perpendicular to the optical path of light emitted by the lamp 9 in the light source unit 10. Thus, when the ND filter unit 47 is rotated by the motor 46, one ND filter having a desired transmission factor is selected so as to correct the quantity of the transmitting light from the light source unit 10.

As shown in FIG. 2, the light passing through the translucent film 14 is turned into a convergent light due to the function of a projection lens 17, and this convergent light is directed to a reflector mirror 18 so that it is reflected and an image from the original image is projected to a projection plate 19. This projection plate 19 has a bottom surface with a light diffusion layer, and it is placed on the contact glass 2 of the image reader unit. When an image projected by the SPU to the projection glass 19 on the contact glass 2, the image reader unit is in a waiting condition and the scanner carriage 3 is placed at a prescribed reading position in the guide rod 8. The film 14 is moved by the film moving mechanism shown in FIG. 4. As shown, the reference glass 15 is moved at a given speed by the motor 16 via a connecting member indicated by the dotted line in FIG. 4. The translucent film 14 is pressed on the reference glass 15 by the retaining glass 13 (i.e., with the film between 13 and 15). Thus, as the film 14 is supported between the reference glass 15 and the retaining glass 13, the film 14 is moved at a speed which is the same as the moving speed of the reference glass 15 by the motor 16, such that the motor 16 provides the drive for moving the film 14. The projected image from the SPU 10 is read out per a scanning line by the image reader unit.

Figure 1:
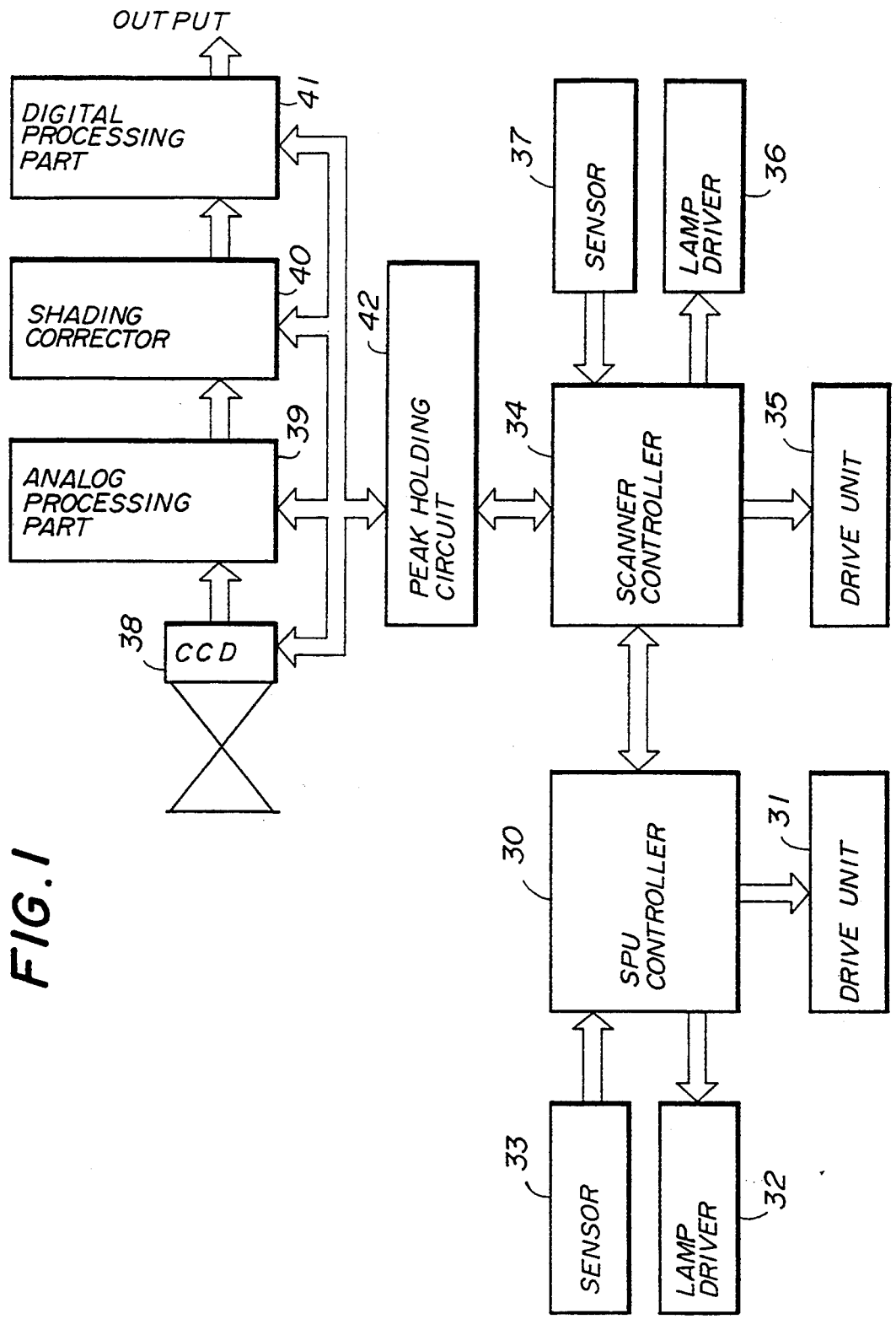
FIG. 1 is a block diagram showing an image reading apparatus including an image reader unit and a slide projector unit according to the present invention.

FIG. 1 shows the image reading apparatus of the present invention, and this apparatus is provided with the slide projector unit (SPU) and the image reader unit. The SPU includes a SPU controller 30, a drive unit 31, a lamp driver circuit 32 and a sensor part 33. The SPU controller 30 has a CPU as the major component. The drive unit 31 drives and operates mechanical parts in the SPU, and the driven mechanical parts are, for example, a film scanning motor, a color correction filter switching motor, a light-quantity corrector motor and a cooling fan. The lamp driver circuit 32 functions to switch on and off a halogen lamp, and the sensor part 33 detects a prescribed home position of a film moving unit (or the SPU unit) and detects a prescribed position of a film cassette (or the SPU unit).

The image reader unit includes a scanner controller 34, a drive unit 35, a sensor part 37, and a lamp driver circuit 36. The scanner controller 34 has a CPU as the major component. The drive unit 35 functions to operate a driving motor for moving the scanner and functions to operate a cooling fan provided in the driving motor. The lamp driver circuit 36 includes a fluorescent lamp for illuminating a reflection type original image and functions to switch on and off the fluorescent lamp. The sensor part 37 detects a prescribed home position of the scanner moving unit and detects a temperature of a fluorescent lamp wall.

In FIG. 1, a signal processing unit of the image reading apparatus is also shown. The signal processing unit includes a CCD unit 38, an analog signal processing part 39, a shading corrector 40, and a digital signal processing part 41. The CCD unit 38 produces an analog signal by scanning a projected image indicated by the illuminated light from the reflection type original image or the translucent film type original image via the SPU. The analog signal processing part 39 performs analog signal processing, and then converts the analog signal into a digital signal through analog-to-digital conversion. The shading corrector 40 stores a shading data obtained by reading out a standard original image, and compares image data actually obtained from the original image with the stored shading data so as to suitably adjust the light quantity of the light source, thereby reducing variations of the light quantity distribution by the light source or reducing variations of the sensitivity of each device of the CCD unit 38. The digital signal processing part 41 carries out an image enlarging/reducing process, a gamma conversion process, a color conversion process and other image processing, and outputs an image signal by the image reader unit to an external printer. In a case of the translucent film (e.g., a 35 mm translucent film), the image signal is converted through the gamma conversion and color correction processes so that the resulting signal exhibits desired output characteristics equivalent to those of the reflection type original image.

Operations of the above mentioned parts 38 through 41 are controlled by timing signals which are supplied by the scanner controller 34 to the parts 38 through 41. A serial interface using an optical fiber is provided to interconnect the SPU controller 30 and the scanner controller 34, and a command signal, a status signal and a data signal are exchanged via the serial interface between the controller 30 and the controller 34. The controller 30 controls operations of the SPU in accordance with an instruction given by the controller 34.

Figure 5:
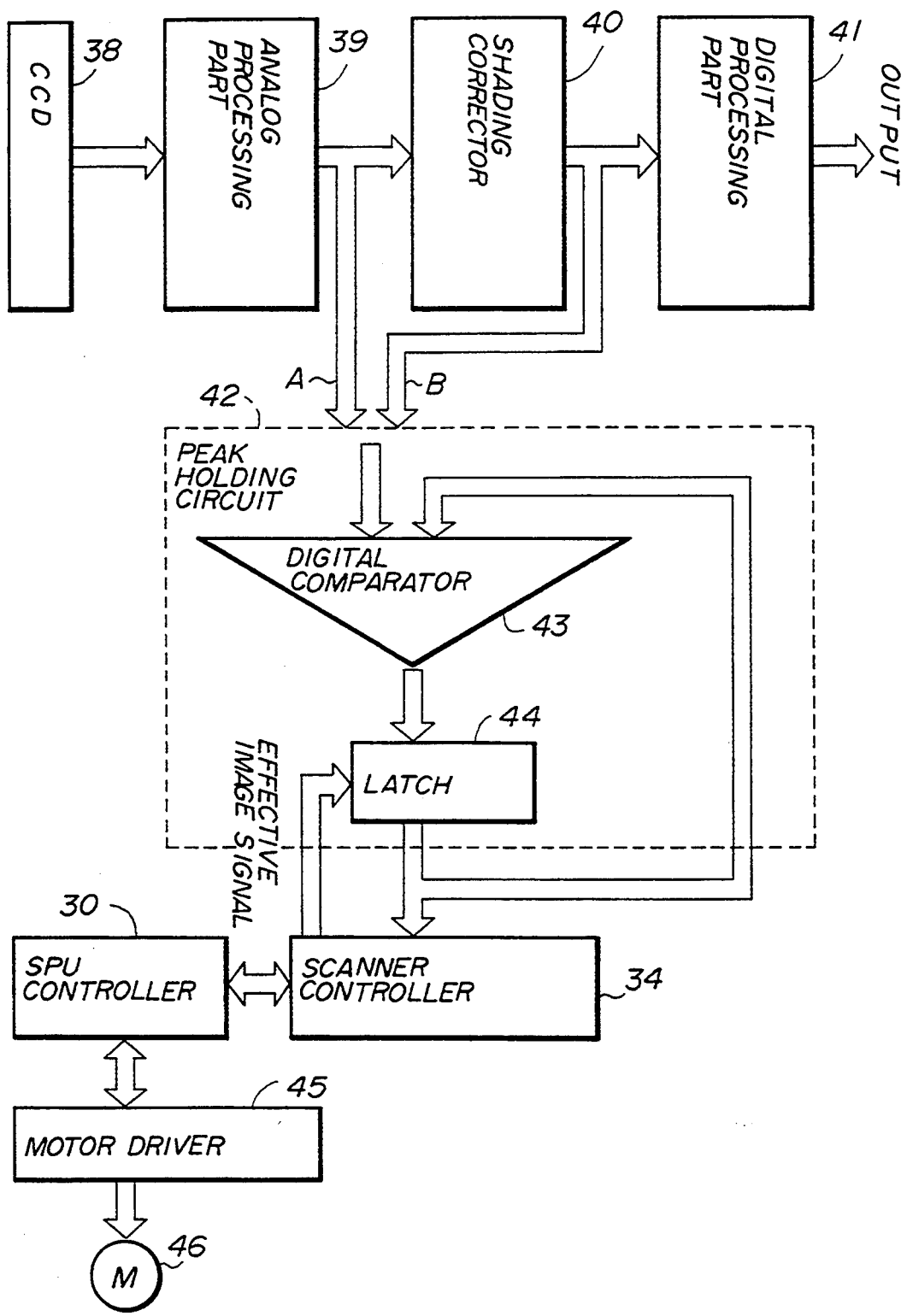
FIG. 5 is a diagram for explaining operations performed by a peak holding circuit.

In FIG. 1, a peak holding circuit 42 is also provided between the scanner controller 34 and the signal processing unit, in order to detect a peak value from among those of image signals obtained by the image reader unit from the original image. FIG. 5 shows the peak holding circuit 42 provided between the scanner controller 34 and the signal processing unit. The peak holding circuit 42 includes a digital comparator 43 and a latch 44. The digital comparator 43 receives an image signal per pixel in accordance with a clock, compares a peak value of the received signal with a previously stored peak value, and holds a greater peak value that is equal to either one of the received signal or the previously stored one, by means of the latch 44.

Figure 6:
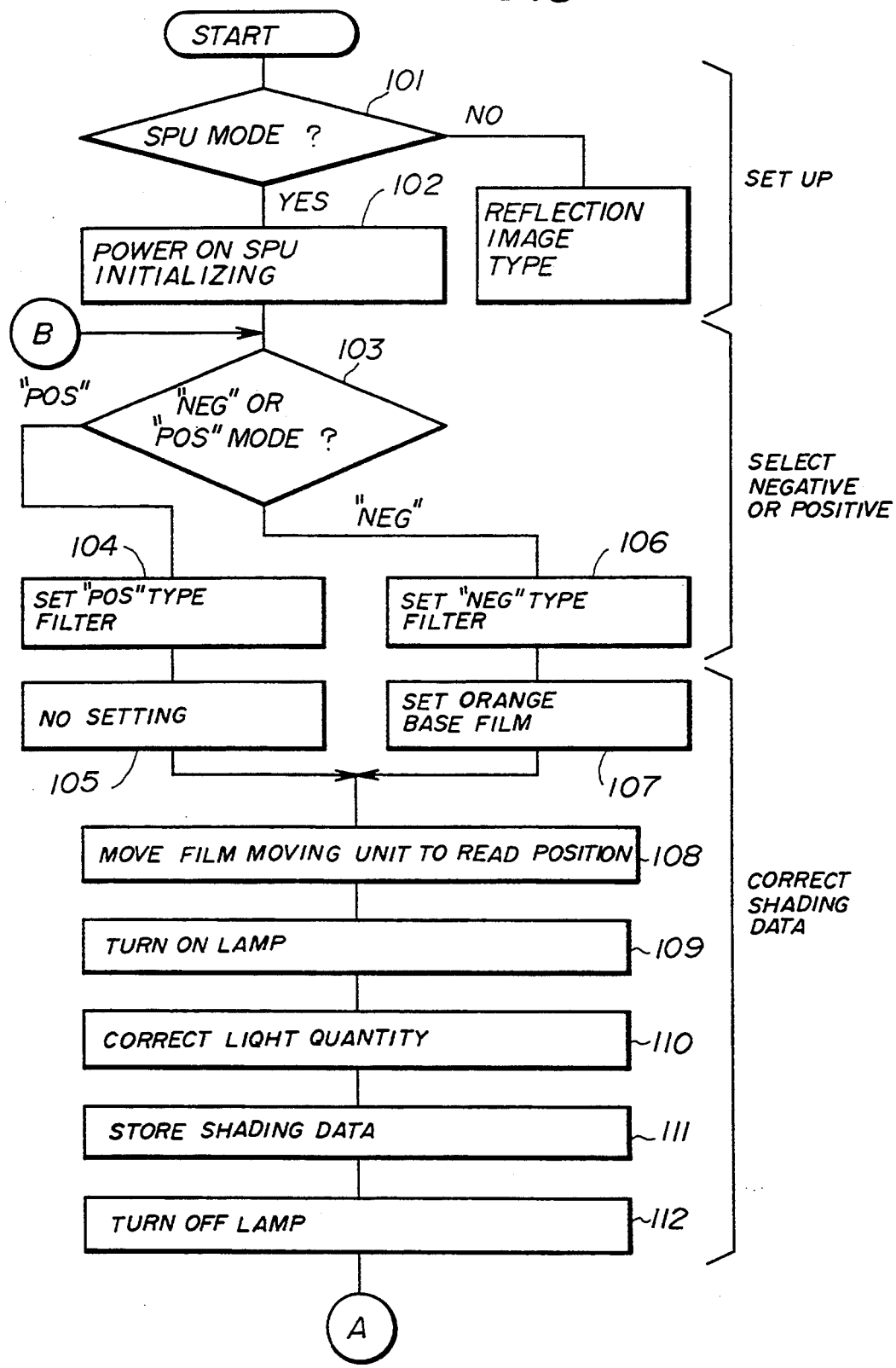
FIGS. 6 and 7 are flow charts for explaining operations performed by the image reading apparatus with the slide projector unit.
Figure 7:
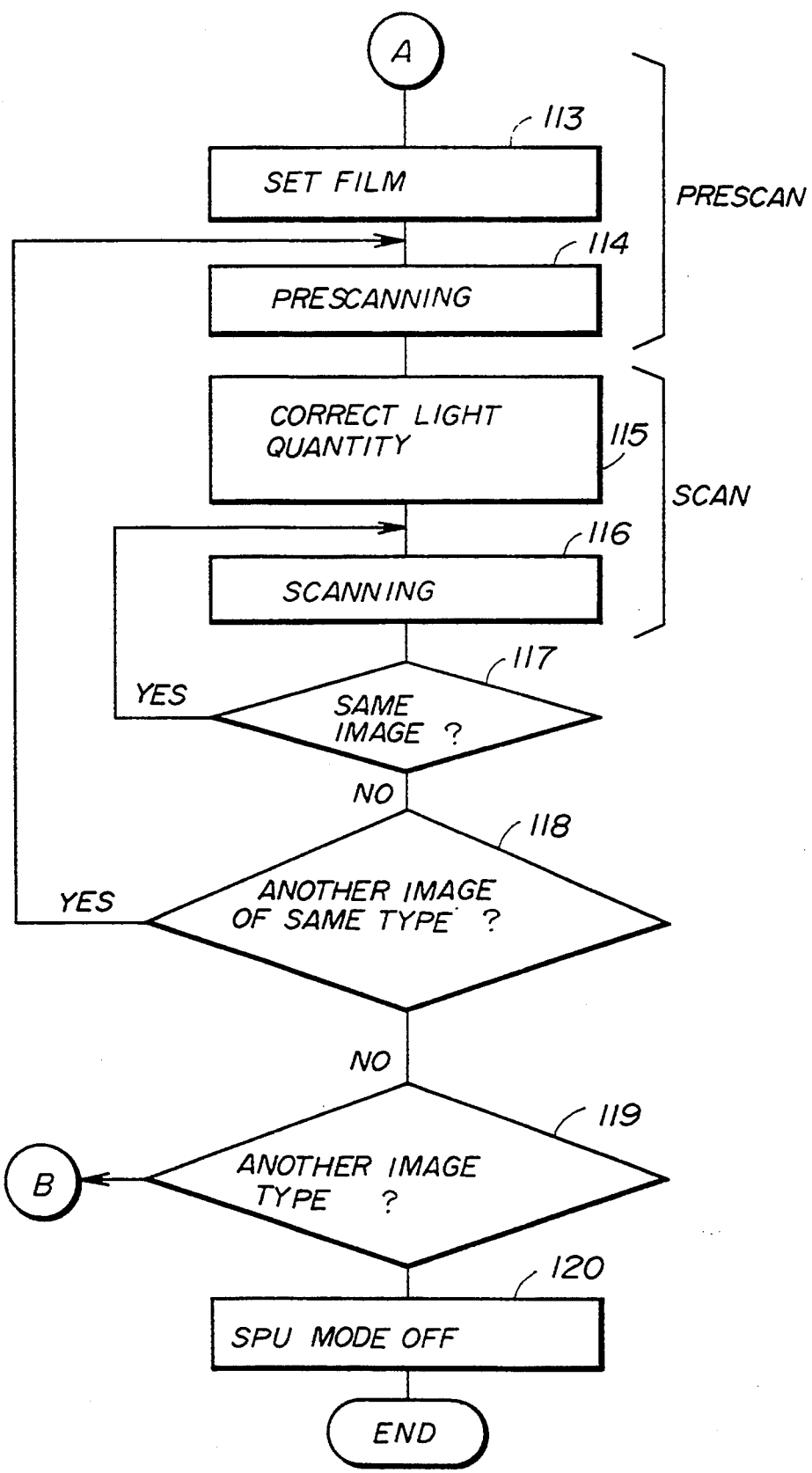

FIGS. 6 and 7 show operations performed by the SPU. A flow of the SPU operations of FIGS. 6 and 7 is divided into the following five procedures:

1. Set Up

As shown in FIG. 6, step 101 detects whether or not the image reading apparatus is during a SPU mode operation. If the apparatus is in the SPU mode operation, step 102 allows the scanner controller 34 to switch on the power of the SPU 10 so that the SPU 10 is initialized and each of operating conditions thereof is set to the initial load condition. If it is detected in step 101 that it is not during the SPU mode operation, the image reading apparatus performs reading of a reflection type original image.

2. Selecting Negative Or Positive

Step 103 detects whether a negative mode or a positive mode is selected by the image reading apparatus according to the type of the film of an original image being scanned. If the positive mode is selected, step 104 sets a "positive" type color filter in the SPU. If the negative mode is selected, step 106 sets a "negative" type color filter in the SPU.

3. Correcting Shading Data

If the positive mode is selected in step 104, no filter is set to the film moving unit in step 105. If the negative mode is selected, step 107 sets an orange base film to the film moving unit. Step 108 allows the SPU controller 30 to move the film moving unit to the prescribed reading position. Also, step 108 allows the scanner controller 34 to move the scanner carriage so that the CCD unit 38 on the carriage is placed at an image projection position where the transmitting light is diverging from the SPU 10. Step 109 allows the SPU controller 30 to switch on the lamp 9 of the SPU 10 so that the lamp 9 is turned on at the initial value of the light quantity thereof. Step 110 allows the SPU controller 30 to correct the light quantity of the light source into an appropriate value by means of the peak holding circuit 42. Step 111 allows the scanner controller 34 to store data obtained by the CCD unit 38 as a shading correction data in a memory. Step 112 allows the SPU controller 30 to switch off the lamp 9 and to return the film moving unit back to the home position.

4. Prescanning

As shown in FIG. 7, step 113 sets the film of the original image to the film cassette. Step 114 allows the SPU controller 30 to switch on the lamp 9 and allows the film moving unit to move so that prescanning of the film of the original image is performed. Step 115 corrects the light quantity of the light source during the prescanning by means of the peak holding circuit 42 such that the corrected light quantity is used to appropriately correct the light quantity of the light source during scanning of the film of the original image.

5. Scanning

Step 116 carries out scanning of the film of the original image at a scanning speed that is in accordance with a predetermined enlarge/reduce factor. The projected image produced by the SPU 10 is read out per a scanning line by the CCD unit 38. The shading data is corrected by the shading corrector 40 for each pixel in the projected image, based on the shading correction data stored in the memory (step 111). After the shading correction is carried out, the corrected data is output to the printer through the printer interface.

In the above described flow, step 117 detects whether or not reading of the film of the same original image is repeated. If reading of the same original image is repeated, the same procedure starting from the above step 116 is performed. Step 118 detects whether or not reading of a film of the same type (negative or positive) of another original image is next performed. If such is affirmative, the above procedure starting from the step 114 is repeated. Step 119 detects whether or not reading of a film of another type (negative or positive) of another original image is next performed. If such is affirmative, the above procedure starting from the step 103 is repeated. Step 120 resets the SPU mode of the image reading apparatus to "off" state.

Next, a description will be given of the correction of the light quantity which is performed in the above described flow chart, by referring to FIG. 5. When the light quantity of the light source is corrected in the step 110, a signal indicating the shading data after the analog-to-digital conversion is performed, is supplied from the analog signal processing part 39 to the peak holding circuit 42 via a path indicated by "A" in FIG. 5. When the light quantity of the light source is corrected in the step 115, an image signal indicating the image after the shading correction of the translucent film original image is performed, is supplied from the shading corrector 40 to the peak holding circuit 42 via a path indicated by "B" in FIG. 5.

The digital comparator 43 of the peak holding circuit 42 receives an image signal supplied via the path "A" or "B" per pixel in accordance with a clock, compares a peak value of the received signal with a previously stored peak value, and outputs a greater peak value, that is equal to either one of the received signal or the previously stored one, to the latch 44 so that the greater peak value is held by the latch 44. A signal indicating the peak value being held is output by the latch 44 to the scanner controller 34, and fed back to the input of the digital comparator 43. The scanner controller 34 supplies a signal indicating an effective range of the original image to the latch 44, the effective range signal being synchronized with a signal indicating image data in an effective range of the original image. The peak value being held by the latch 44 is that held from those of image signals only in the effective image range of the original image. Thus, the peak value supplied by the latch 44 after the effective range signal has been given to the latch 44, is used for correcting the light quantity in each of the steps 110 and 115.

The scanner controller 34 receives the peak value from the peak holding circuit 42, and a signal indicating the received peak value is sent to the SPU controller 30 via the serial interface. The SPU controller 30 receives the peak value signal from the scanner controller 34, determines a required transmission factor from a conversion table used in each of the steps 110 and 115, and selects a ND filter having the required transmission factor. In accordance with the selected ND filter, the SPU controller 30 allows the motor driver 45 to drive the motor 46 so that the ND filter unit 47 is rotated by the motor 46 and the selected ND filter having the required transmission factor is placed at a suitable position in the optical path of light emitted by the light source unit 10.

Figure 8:
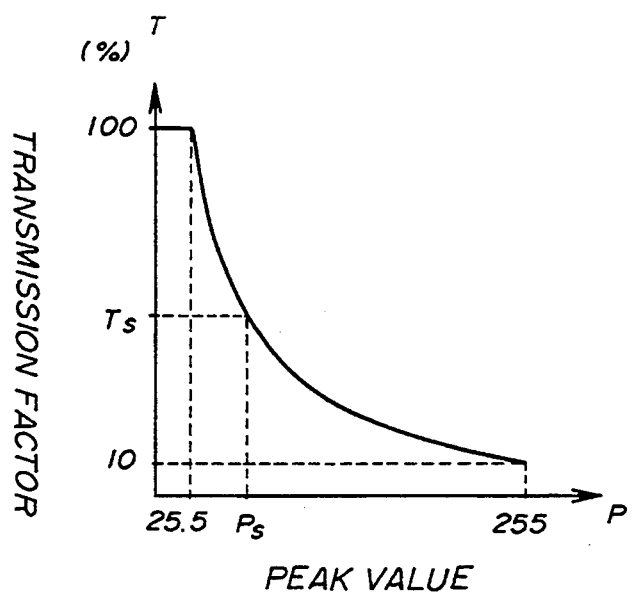
FIG. 8 is a characteristic chart showing a relationship between a transmission factor of a filter and a peak value of an effective image signal.

FIG. 8 shows a characteristic relationship between a peak value P (of the effective image range) and a required transmission factor T (of the selected ND filter). A peak value P among those of image signals in the effective image range is measured, and a required transmission factor T of the ND filter is selected in accordance with the peak value P. Now, suppose that a minimum transmission factor in the ND filter unit 47 is 10%, for example. In the above step 110, a standard transmission factor Ts of the ND filter is selected and determined in such a manner that, with the minimum transmission factor of 10% being fixed, scanning of the film moving unit with no film or scanning of the film moving unit with the orange base film thereon in the effective image range is performed so that a standard peak value Ps in the effective image range is equal to 255. The standard transmission factor Ts in this case is represented by the following formula.

$$Ts = 255 \times 10/Ps \quad (26 \leq Ps \leq 255)$$

$$Ts = 100 \quad (0 \leq Ps \leq 25) \tag{1}$$

In FIG. 8, the characteristic relationship is illustrated with the peak value P being the axis of abscissas and the transmission factor T being the axis of ordinates.

Figure 9:
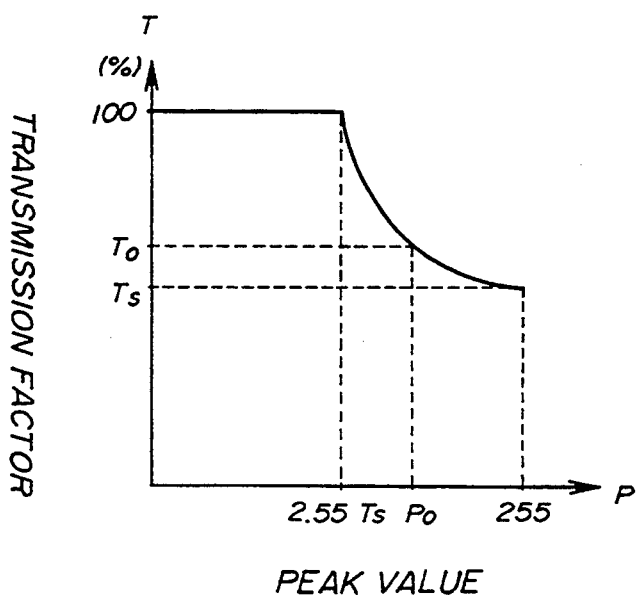
FIG. 9 is a characteristic chart showing a relationship between a transmission factor of the filter and a peak value of the effective image signal.

FIG. 9 shows a characteristic relationship between the peak value P and the required transmission factor T. In the above step 115, with the standard transmission factor Ts obtained in the step 110 being the initial value, scanning of the film of the original image in the effective image range is performed so that a peak value Po is measured from those of image signals obtained from the original image. A required transmission factor To of the ND filter is selected in accordance with the peak value Po of the original image in the effective image range. The required transmission factor To is represented by the following formula.

$$To = 255 \times Ts/Po \quad (2.55Ts \leq Po \leq 255)$$

$$To = 100 \quad (0 \leq Po \leq 2.55Ts) \tag{2}$$

In the light quantity correction of the step 110, the light quantity of the light source is set to an appropriate standard level, and this standard level is fixed irrespective of the characteristics of the ND film and irrespective of variations of light intensity of the light source. In the light quantity correction of the step 115, an ND filter having an optimum transmission factor is selected in accordance with the peak value obtained from image signals after an image is projected from the translucent film of the original image.

Figure 10:
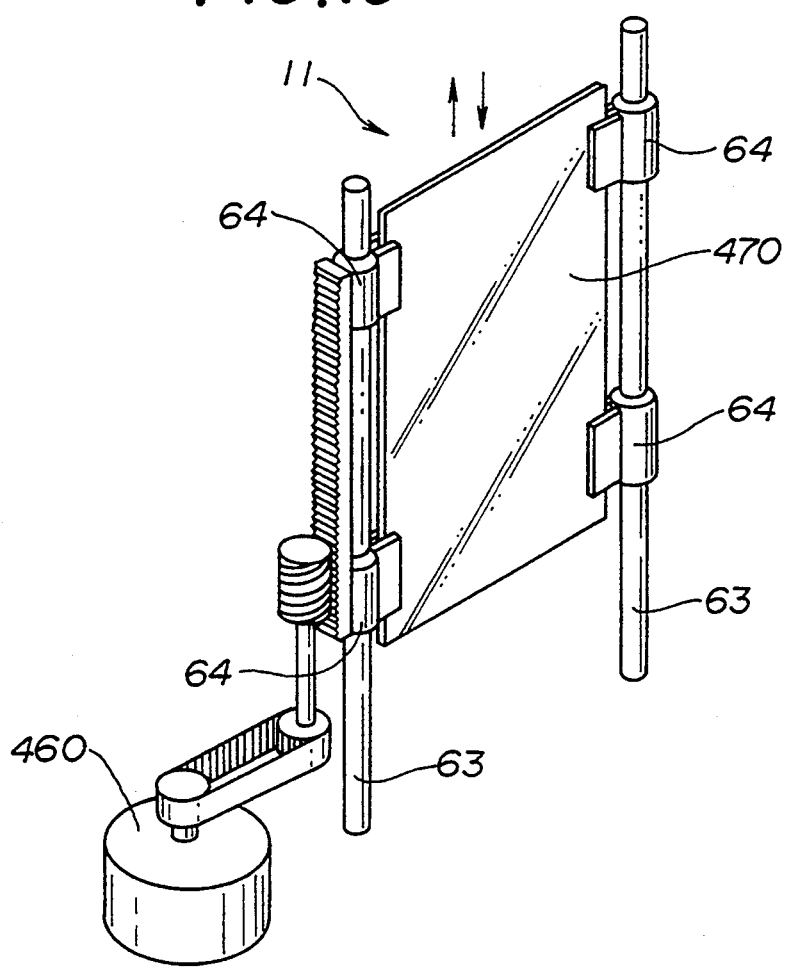
FIG. 10 is a perspective view showing the construction of another light quantity corrector.

FIG. 10 shows another light quantity corrector 11 which is modified from the light quantity corrector 11 of FIG. 3. In FIG. 10, the light quantity corrector 11 includes a modified ND filter 470 supported on two guide rods 63 using mounting members 64, and a motor 460 for vertically moving the ND filter 470, together with the guide rods 63, along vertical lines of the guide rods 63. The ND filter 470 is formed with continuously varied transmission factors, and the transmission factors are unchanged along a horizontal line at right angles to the guide rods 63 and are continuously changed along the vertical lines thereof. As shown, the light quantity corrector 11 is so arranged that the ND filter 470 is moved up and down in directions indicated by arrows in FIG. 10 when the motor 460 is rotated.

Figure 11:
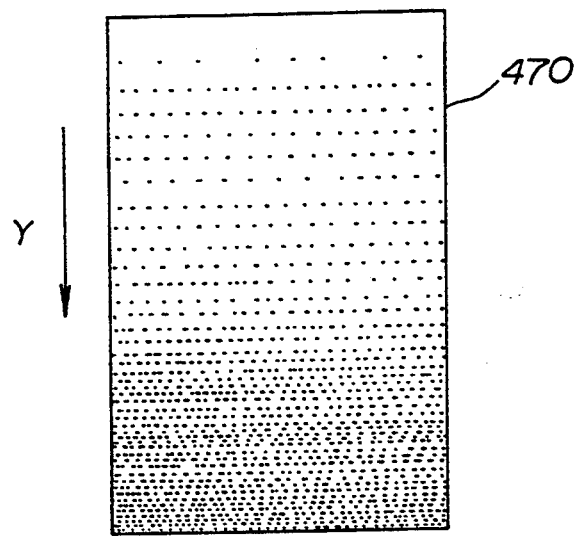
FIG. 11 is a front view showing a filter provided in the light quantity corrector of FIG. 10.
Figure 12:
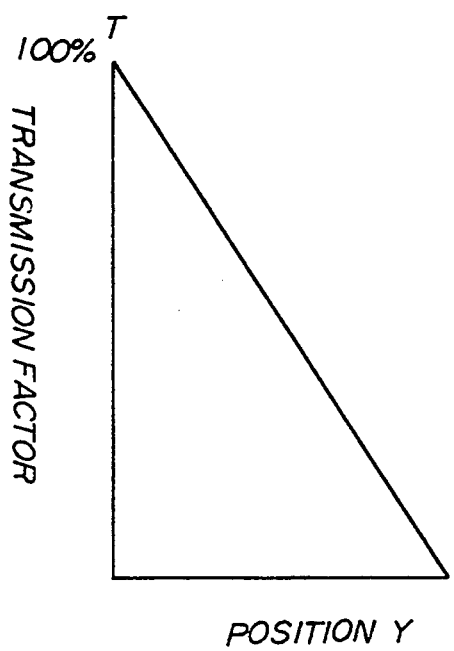
FIG. 12 is a chart showing a transmission factor distribution of the filter of FIG. 11.

FIG. 11 is a front view showing the ND filter 470 of FIG. 10. This ND filter 470 is made of a homogeneous sheet material (e.g., a glass plate). The sheet material of the filter 470 is suitably shaded or formed so as to exhibit a constant transmission factor being unchanged along a horizontal line at right angles to the guide rods 63 and to exhibit continuously varied transmission factors changed in a vertical direction parallel to the guide rods 63, this vertical direction being indicated by an arrow Y in FIG. 11 which direction corresponds to the indicated vertical direction in which the ND filter 470 is moved up and down by the motor 460 in FIG. 10. For example, the transmission factor of the ND filter 470 is continuously varied in the vertical direction "Y" from 100% transmission factor at the top of the filter (Y=0) to 0% transmission factor at the bottom thereof. FIG. 12 shows changes in the transmission factor T of this ND filter 470 in relation to the vertical position Y thereof.

Thus, if the light quantity corrector 11 having the ND filter 470 with the continuously varied transmittance shown in FIG. 10 is arranged in the SPU unit in place of the corrector 11 shown in FIGS. 2 and 4, it is possible to accurately adjust the light quantity of the transmission light by moving up/down the ND filter 470 in relation to the height of the optical path of the light emitted by the light source unit 10. The ND filter 470 provided in the light quantity corrector 11 is moved up and down in the vertical direction by rotating the motor 460 around its vertical rotating shaft.

Figure 19:
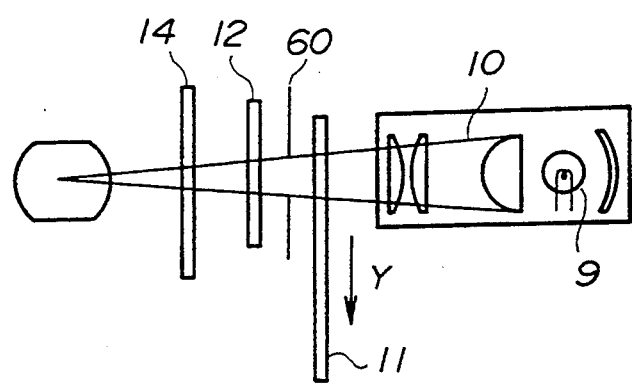
FIG. 19 is a sectional view showing the construction of another slide projector unit.

FIG. 19 shows the construction of another SPU unit in which the ND filter 470 having continuously varied transmission factors, as shown in FIG. 11, is provided within the light quantity corrector 11. In FIG. 19, those parts which are the same as those corresponding parts of the light quantity corrector 11 of FIG. 2 are designated by the same reference numerals, a description thereof being omitted. In this SPU unit, a slit member 60 having a slit opening extending transversely in a horizontal direction of the color correcting filter is placed between the light quantity corrector 11 and the color correcting filter 12. The light emitted by the lamp 9 of the light source unit 10 is passed through the slit opening of the slit member 60 so that an effective light beam convergent into the projection lens 17 is produced. The quantity of the transmitting light from the light source unit 10 is appropriately adjusted by moving up and down the ND filter 470 of the light quantity corrector 11 in a vertical direction indicated by an arrow Y in FIG. 19 in relation to the height of this effective light beam. The quantity of the transmitting light is determined depending on the average light quantity of the effective light beam. As described above, the ND filter 470 has transmission factors being continuously varied in the vertical direction "Y".

Figure 13:
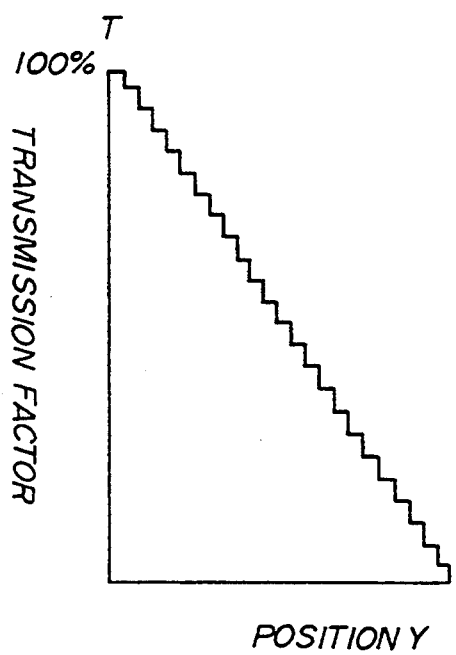
FIG. 13 is a chart showing a transmission factor distribution of another filter provided in a light quantity corrector.
Figure 14:
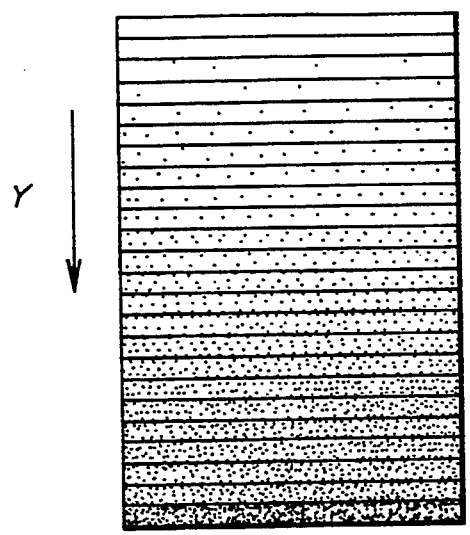
FIG. 14 is a front view showing the filter of the light quantity corrector of FIG. 13.

However, it is also possible that a number of steps of different transmission factors is given to the ND filter 470 at prescribed intervals of distance in the vertical direction "Y" as shown in FIG. 13. FIG. 14 is a front view showing this ND filter 470 having a number of steps of different transmission factors. In this ND filter 470, each step of the transmission factor is determined depending on the range of required light quantity of transmitting light and depending on the effective light beam.

Figure 15:
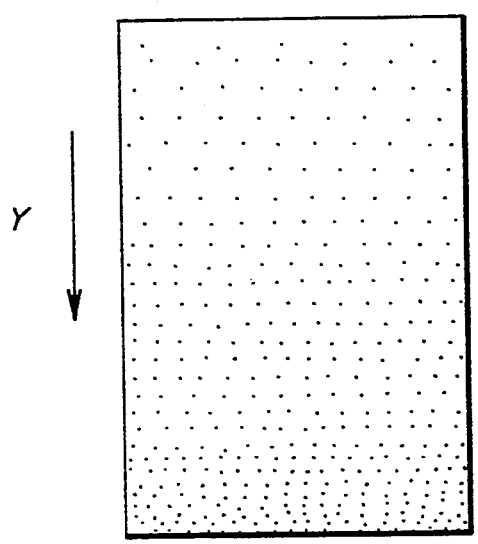
FIG. 15 is a front view showing still another filter of a light quantity corrector.
Figure 16:
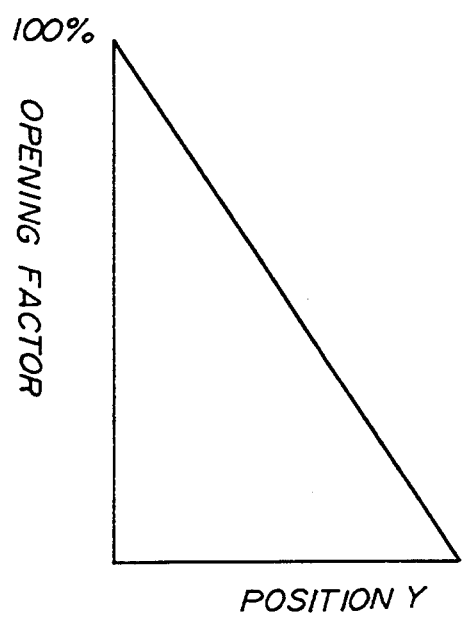
FIG. 16 is a chart showing an opening factor distribution of the filter of FIG. 15.
Figure 17:
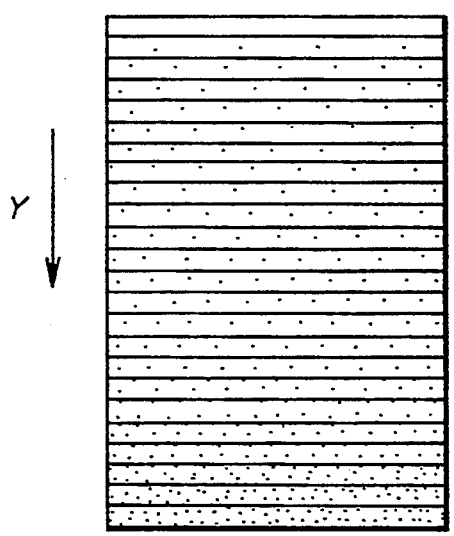
FIG. 17 is a front view showing another filter provided in the light quantity corrector.
Figure 18:
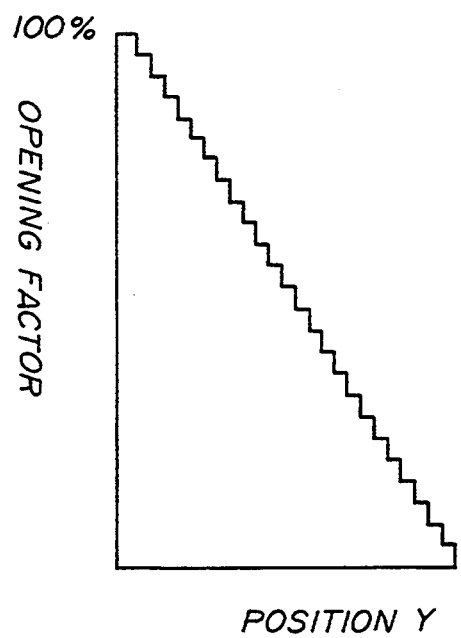
FIG. 18 is a chart showing an opening factor distribution of the filter of FIG. 17.

In addition, another ND filters may be used in the light quantity corrector 11 of the present invention. FIGS. 15 and 16 show an example of a modified ND filter which has an opening factor continuously varied (or linearly changed) in the vertical direction "Y" in relation to the vertical position of the ND filter. FIGS. 17 and 18 show another example of the modified ND filter which has a number of steps of different opening factors changed in the vertical direction "Y" similarly to the above. These modified ND filters are also applicable to the light quantity corrector 11 of the present invention. In order to vary the opening factor of the ND filter, the ND filter is shaded or printed with a suitable opaque material and the resulting printed dots have a different area ratio being varied in the vertical direction "Y". (as should be readily apparent from the similarity of the drawing figures, the transmission factor is analogous to the opening factor, however the term "opening" is utilized with reference to filters which are produced by providing an opaque material, for example by printing an opaque material on the filter, while reference to transmission factor is utilized in the context of a filter which does not utilize an opaque material thereon—in other words, "opening factor" is utilized since the opening is restricted when an opaque material is utilized for the filter)

Further, the present invention is not limited to the above described embodiments, and variations and modifications may be made without departing from the scope of the present invention.

What is claimed is:

1. An apparatus for reading an image from an original image on a translucent film, said apparatus comprising:
   a projector for projecting light through the translucent film so as to produce a projected image from the original image;
   correction means for adjusting a quantity of the light projected by said projector;
   an image sensor for reading out an image from the projected image produced by said projector and outputting an analog signal indicating the read-out image;
   signal conversion means for converting the analog signal output by said image sensor into a digital signal indicating the read-out image; and control means for detecting a peak value of digital signals supplied by said signal conversion means with respect to an effective range of the original image;

peak value holding means for comparing the peak value detected by said control means with a previously stored peak value and for selecting the greater peak value;

shading correction means for storing shading data which is indicated by a standard image signal output by said signal conversion means from a standard image read out from a standard original image, and for adjusting the digital signal output by said conversion means from the image read out from the original image, in accordance with shading data stored in said shading correction means;

said correction means including a light quantity correction filter having a plurality of transmission factors such that the quantity of the projected light is adjusted by selecting one of said plurality of transmission factors, with the selected one of said plurality of transmission factors determined in response to the selected peak value of the digital signals, and wherein said standard image signal output by said signal conversion means from the standard original image is supplied to said peak value holding means such that said correction means adjusts the quantity of the projected light using a first transmission factor of said light quantity correction filter, with the first transmission factor selected based upon the selected peak value output by said peak value holding means from the standard original image, and further wherein the digital signal output by said signal conversion means from the original image is Supplied to said shading correction means after the quantity of light is adjusted based on the standard image signal, and the digital signal adjusted by said shading correction means is supplied to said peak value holding means such that said correction means adjusts the quantity of the projected light by using a second transmission factor of said light quantity correction filter, with the second transmission factor selected based on the selected peak value output by said peak value holding means from the original image.

2. An apparatus according to claim 1, wherein said light quantity correction filter is made of a homogeneous sheet material, said filter having a transmission factor that is continuously changed in a vertical direction of said filter and kept at a constant level in a horizontal direction of said filter.

3. An apparatus according to claim 2, wherein said correction means further includes a slit member having an opening extending in a horizontal direction of said light quantity correction filter.

4. An apparatus according to claim 1, wherein said light quantity correction filter is made of a homogeneous sheet material, said filter having a number of steps of different transmission factors that are changed in a vertical direction of said filter, each step of said different transmission factors being kept at a constant level in a horizontal direction of said filter.

5. An apparatus according to claim 1, wherein said correction means comprises a circular light quantity corrector filter having a plurality of light quantity correction filters which are circumferentially arranged in said corrector, said filters having a number of steps of different transmission factors that are changed in a circumferential direction of said corrector.

6. An apparatus according to claim 5, wherein said correction means further comprises a driving motor for rotating said circular light quantity corrector around a rotating axis of said driving motor, one of said light quantity correction filters being selected when said corrector is rotated by said driving motor.

* * * * *

UNITED STATES PATENT AND TRADEMARK OFFICE
CERTIFICATE OF CORRECTION

PATENT NO.    : 5,414,535
DATED         : May 9, 1995
INVENTOR(S)   : Yoshiaki KANMOTO, et al.

It is certified that error appears in the above-indentified patent and that said Letters Patent is hereby corrected as shown below:

On the title page, Item [75], the third inventor's name should read:

--Kohtarou Yonenaga--

Also on the title page, the Foreign Application Priority Data, Item [30], was omitted.  It should read:

```
--May 22, 1991 [JP]    Japan .........3-117704
  May 22, 1991 [JP]    Japan .........3-117705
  Jul 30, 1991 [JP]    Japan .........3-190068
  Jan 22, 1992 [JP]    Japan .........4-009324--
```

Signed and Sealed this

Twenty-first Day of May, 1996

*Attest:*

BRUCE LEHMAN

*Attesting Officer*    *Commissioner of Patents and Trademarks*